(12) United States Patent
Lin

(10) Patent No.: US 9,679,525 B2
(45) Date of Patent: Jun. 13, 2017

(54) DISPLAY DEVICE AND SUPPORT UNIT FOR THE SAME

(71) Applicants: BOE TECHNOLOGY GROUP CO., LTD., Beijing (CN); K-Tronics (Su Zhou) Technology Co., Ltd., Suzhou, Jiangsu Province (CN)

(72) Inventor: Rensheng Lin, Beijing (CN)

(73) Assignees: BOE TECHNOLOGY GROUP CO., LTD., Beijing (CN); K-TRONICS (SU ZHOU) TECHNOLOGY CO., LTD., Suzhou (CN)

( * ) Notice: Subject to any disclaimer, the term of this patent is extended or adjusted under 35 U.S.C. 154(b) by 58 days.

(21) Appl. No.: 14/803,191

(22) Filed: Jul. 20, 2015

(65) Prior Publication Data

US 2016/0155392 A1    Jun. 2, 2016

(30) Foreign Application Priority Data

Nov. 28, 2014    (CN) .................... 2014 2 0735568 U

(51) Int. Cl.
*A47G 23/02*    (2006.01)
*G09G 3/36*    (2006.01)
(Continued)

(52) U.S. Cl.
CPC .............. *G09G 3/36* (2013.01); *F16M 11/16* (2013.01); *F16M 11/22* (2013.01); *F16M 2200/08* (2013.01)

(58) Field of Classification Search
USPC ......................................... 248/146, 917–924
See application file for complete search history.

(56) References Cited

U.S. PATENT DOCUMENTS

| | | | | |
|---|---|---|---|---|
| 4,329,800 A | * | 5/1982 | Shuman | F16B 7/105 40/606.14 |
| 6,366,452 B1 | * | 4/2002 | Wang | F16M 11/10 248/125.1 |

(Continued)

*Primary Examiner* — Monica Millner
(74) *Attorney, Agent, or Firm* — Calfee, Halter & Griswold LLP

(57) ABSTRACT

The present disclosure discloses a support unit for a display device and a display device, which relate to the technical field of a liquid crystal display device. The present disclosure is created to solve the problem of complicated assembling and disassembly of the support unit of the display device in the prior art. The present disclosure provides a support unit for the display device, which includes a pedestal and a bracket, wherein one end of the bracket is connected to a display panel, the other end of the bracket is insert-connected with the pedestal through an insert-connecting structure and is locked by a snap structure. The insert-connecting structure includes a first insert-connecting portion disposed at the pedestal and a second insert-connecting portion disposed at the bracket. The snap structure includes a first snap portion disposed at the pedestal and a second snap portion disposed at the bracket. The cooperating insert-connection between the first insert-connecting portion and the second insert-connecting portion can guide the first snap portion and the second snap portion to be snap-fitted mutually, so that the disengaging of the pedestal from the bracket along an insert-connecting direction can be prevented.

20 Claims, 5 Drawing Sheets

(51) Int. Cl.
*F16M 11/22* (2006.01)
*F16M 11/16* (2006.01)

(56) References Cited

U.S. PATENT DOCUMENTS

| | | | | |
|---|---|---|---|---|
| 6,443,408 | B1* | 9/2002 | Hung | F16M 11/04 |
| | | | | 248/130 |
| 6,935,883 | B2* | 8/2005 | Oddsen, Jr. | H01R 13/625 |
| | | | | 248/274.1 |
| 7,145,767 | B2* | 12/2006 | Mache | F16M 11/00 |
| | | | | 361/679.21 |
| 7,591,443 | B2* | 9/2009 | Lee | F16M 11/00 |
| | | | | 248/158 |
| 7,869,202 | B2* | 1/2011 | Chiang | G06F 1/1601 |
| | | | | 248/917 |
| 8,628,052 | B2* | 1/2014 | Lee | F16M 11/08 |
| | | | | 248/122.1 |
| 8,670,232 | B2* | 3/2014 | Bliven | F16M 11/041 |
| | | | | 248/917 |
| 2004/0084588 | A1* | 5/2004 | Liu | F16M 13/00 |
| | | | | 248/291.1 |
| 2006/0117623 | A1* | 6/2006 | Watanabe | F16M 11/00 |
| | | | | 40/606.15 |
| 2007/0002529 | A1* | 1/2007 | Drew | F16M 11/24 |
| | | | | 361/679.22 |
| 2007/0097617 | A1* | 5/2007 | Searby | F16M 11/04 |
| | | | | 361/679.4 |
| 2015/0034778 | A1* | 2/2015 | Lin | G06F 1/1613 |
| | | | | 248/124.1 |

* cited by examiner

DISPLAY DEVICE AND SUPPORT UNIT FOR THE SAME

RELATED APPLICATIONS

The present application claims the benefit of Chinese Patent Application No. 201420735568.3, filed on Nov. 28, 2014, the entire disclosure of which is incorporated herein by reference.

BACKGROUND OF THE DISCLOSURE

1. Field of the Disclosure

The present disclosure relates to the technical field of a liquid crystal display device, in particular to a display device and a support unit for the same.

2. Description of the Prior Art

Panel display devices have advantages such as light weight, thin body, low radiation etc., which gradually become the main stream in display market in place of cathode ray tube display device.

As shown in FIG. 4 and FIG. 5, most of current liquid crystal display device is made up by a display panel 01 and a support unit 02. The support unit 02 generally comprises a pedestal 022 and a bracket 021. The pedestal 022 and the bracket 021 are generally fixedly connected or connected through bolt(s). When assembling or disassembling the support unit 02, the bolt(s) needs to be screwed manually which makes the assembly and disassembly process of the support unit 02 relatively troublesome and causes inconvenience to the user when he assembling the liquid crystal display device.

SUMMARY OF THE DISCLOSURE

An embodiment of the present disclosure provides a display device and a support unit for the same. A pedestal and a bracket of the display device can be assembled or disassembled without screwing bolt(s). Therefore, the assembly and disassembly of the support unit can be more convenient.

In order to achieve the above objects, an embodiment of the present disclosure employs the following technical solutions:

In one aspect, an embodiment of the present disclosure provides a support unit for the display device, comprising a pedestal and a bracket, one end of the bracket is connected to a display panel, the other end of the bracket is insert-connected with the pedestal through an insert-connecting structure and is locked by a snap structure. The insert-connecting structure comprises a first insert-connecting portion disposed at the pedestal and a second insert-connecting portion disposed at the bracket. The snap structure comprises a first snap portion disposed at the pedestal and a second snap portion disposed at the bracket. The cooperating insert-connection between the first insert-connecting portion and the second insert-connecting portion can guide the first snap portion and the second snap portion to be snap-fitted mutually, so that the disengaging of the pedestal from the bracket along an insert-connecting direction can be prevented.

Furthermore, a first recessed hole is provided in the first insert-connecting portion and the first snap portion is disposed in the first recessed hole; a second recessed hole is provided in the second insert-connecting portion and the second snap portion is disposed in the second recessed hole, wherein the opening of the first recessed hole is opposite to the opening of the second recessed hole.

Further, the first snap portion comprises a first snap hook disposed in the first recessed hole, the second snap portion comprises a second snap hook disposed in the second recessed hole, the cooperating insert-connection between the first insert-connecting portion and the second insert-connecting portion can guide the first snap hook and the second snap hook to be snap-fitted mutually.

Moreover, the first snap hook is a projection disposed at the inner wall of the first recessed hole, the second snap hook is connected with the bottom face of the second recessed hole through an elastic connecting frame, the cooperating insert-connection between the first inset-connecting portion and the second insert-connecting portion can guide the second snap hook to extend into the first recessed hole and to engage with the first snap hook.

Preferably, the end of the second snap hook is provided with an unlock buckle, the bottom face of the pedestal is provided with an opening, the opening opens to the first recessed hole, the cooperating insert-connection between the first insert-connecting portion and the second insert-connecting portion can guide the unlock buckle to extend into the opening.

Furthermore, the elastic connecting frame can be removed from the bracket.

Preferably, the first insert-connecting portion is an insert slot, the second insert-connecting portion is an insert block that can be inserted into the insert slot; or alternatively the second insert-connecting portion is an insert slot, the first insert-connecting portion is an insert block that can be inserted into the insert slot.

Furthermore, the insert block is in the shape of triangular prism, the shape of the insert slot is adapted to the shape of the insert block.

In assembling the support unit provided by the embodiment of the present disclosure, when the first insert-connecting portion and the second insert-connecting portion are insert-connected, the first snap portion on the pedestal and the second snap portion on the bracket can be approached to each other under the guidance of the first insert-connecting portion and the second insert-connecting portion. After the insert-connecting operation between the first insert-connecting portion and the second insert-connecting portion is completed, the snap fitting operation between the first snap portion and the second snap portion is also completed, so the disengaging of the pedestal from the bracket along the insert-connecting direction can be prevented. Therefore, when assembling the support unit provided by the embodiment of the present disclosure, the pedestal and the bracket can be stably connected together by only one step of insert-connecting operation, without screwing bolt(s) or other operations in the prior at. In this way, the assembling process of the support unit can be simplified and the disassembling and assembling of the support unit of the display device can be more convenient.

Moreover, an embodiment of the present disclosure also provides a display device which comprises a display panel, and the support unit of the display device provided by any one of the above mentioned technical solutions. The display panel and the bracket of the support unit can be removably connected.

Based on the advantages of the support unit provided by the above technical solutions, in the display device comprising the above mentioned support unit provided by the embodiment, the assembling process of the support unit is relatively simple thereby the disassembly and assembly of the display device can be more convenient.

DETAILED DESCRIPTION OF THE PRESENT INVENTION

Figure 1:
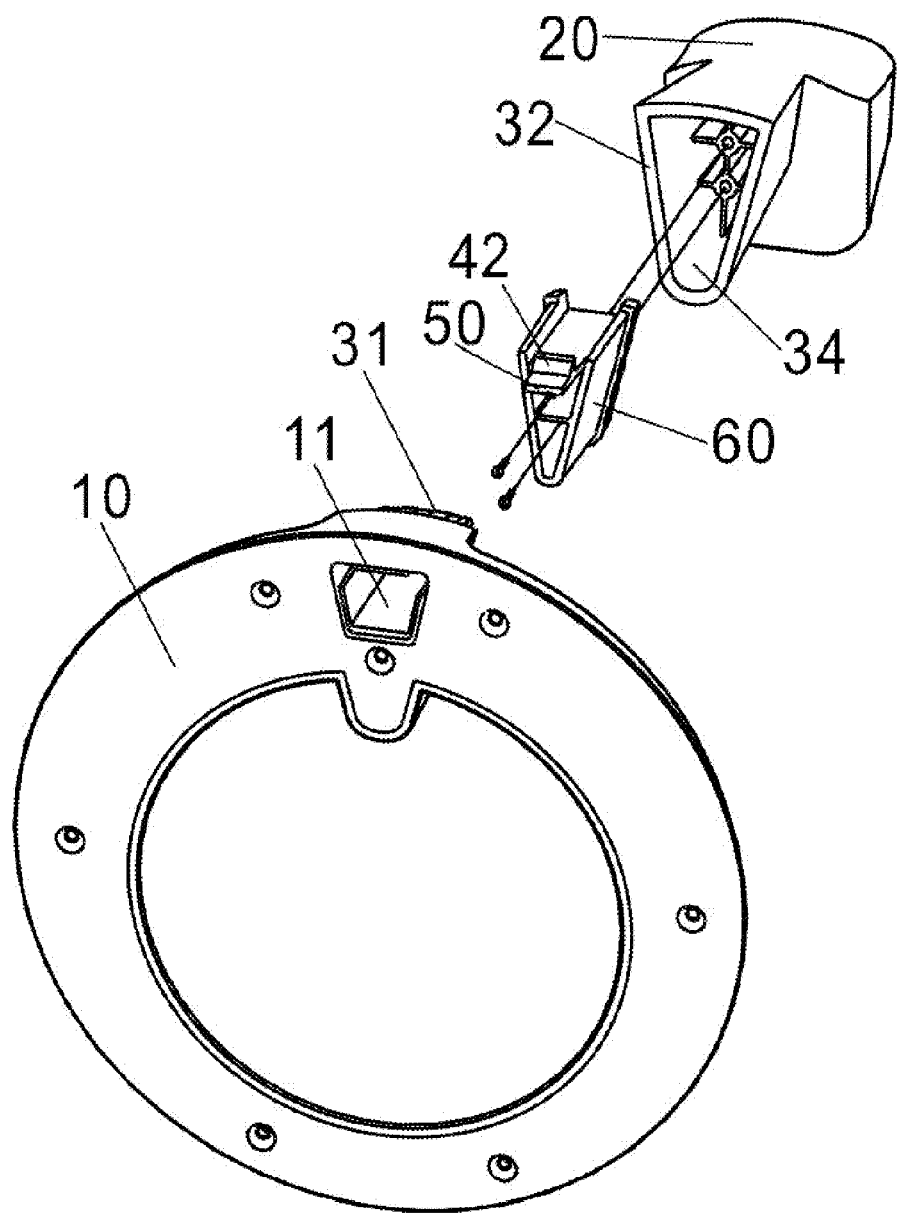
FIG. 1 is an exploded schematic view showing a support unit of a display device provided by an embodiment of the present disclosure.
Figure 2:
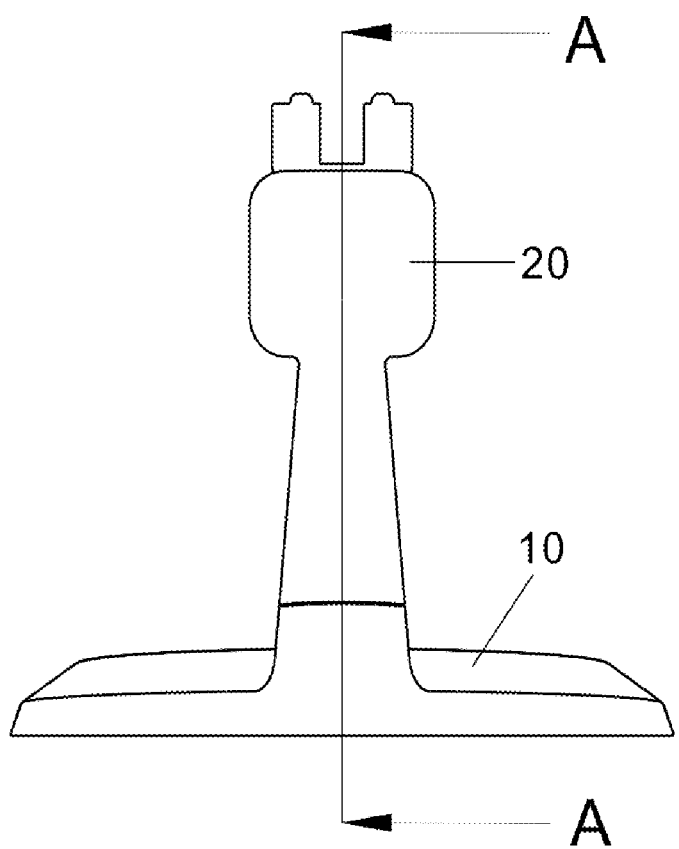
FIG. 2 is a schematic front view showing the structure of the support unit of the display device provided by an embodiment of the present disclosure.

The technical solutions of embodiments of the present disclosure will be clearly and fully described in conjunction with drawings. Obviously, those embodiments are only some embodiments of the present disclosure and not all the embodiments of the present disclosure. Based on these embodiments of the present disclosure, all other embodiments obtained by those ordinary skilled in the art without creative efforts are within the scope of the present disclosure.

The terms such as "first", "second", or the like are only used for the purpose of description, and should not be considered as to indicate or imply relative importance or suggest the number of the referred features. Thereby, the features defined by "first", "second" may indicate or imply that there are one or more such features. In the description of the present disclosure, unless otherwise stated, "a plurality" also implies two or more than two.

In present description, it should be noted that unless otherwise specified or restricted, the terms "mount", "connect", "couple" as used herein can be understood in broad sense, for example, it can be fixedly connected, or removably connected or integrally connected; it can be mechanically connected or electrically connected; it can be directly connected or can be connected through intermediate element. Those skilled in the art of the present disclosure can understand the specific meanings of those terms according to actual situation.

An embodiment of the present disclosure provides a support unit for a display device, comprising a pedestal 10 and a bracket 20. One end of the bracket 20 is connected to a display panel; the other end of the pedestal 10 is insert-connected with the pedestal 10 through an insert-connecting structure 30 and is locked by a snap structure 40. The insert-connecting structure 30 comprises a first snap portion 41 disposed at the pedestal 10 and a second snap portion 42 disposed at the bracket 20. The snap structure 40 comprises a first snap portion 41 disposed at the pedestal 10 and a second snap portion 42 disposed at the bracket 20. The cooperating insert-connection between the first insert-connecting portion 31 and the second insert-connecting portion 32 can guide the first snap portion 41 and the second snap portion 42 to be snap-fitted mutually, so that the disengaging of the pedestal 10 from the bracket 20 along an insert-connecting direction can be prevented.

In assembling the support unit provided by the embodiment of the present disclosure, when the first insert-connecting portion 31 and the second insert-connecting portion 32 are insert-connected, the first snap portion 41 at the pedestal 10 and the second snap portion 42 at the bracket 20 can be approached to each other under the guidance of the first insert-connecting portion 31 and the second insert-connecting portion 32. After the insert-connecting operation of the first insert-connecting portion 31 and the second insert-connecting portion 32 is completed, the snap fitting operation between the first snap portion 41 and the second snap portion 42 is also completed, so the disengaging of the pedestal 10 from the bracket 20 along the insert-connecting direction can be prevented. Therefore, when assembling the support unit provided by the embodiment of the present disclosure, the pedestal 10 and the bracket 20 can be stably connected together by only one step of insert-connecting operation, without screwing bolt(s) or other operations in the prior at. In this way, the assembling process of the support unit can be simplified and the disassembling and assembling of the support unit of the display device can be more convenient, thereby the assembling efficiency can be improved.

Specifically, a first recessed hole 33 is provided in the first insert-connecting portion 31 and the first snap portion 41 is disposed in the first recessed hole 33; a second recessed hole 34 is provided in the second insert-connecting portion 32 and the second snap portion 42 is disposed in the second recessed hole 34, wherein the opening of the first recessed hole 33 is opposite to opening of the second recessed hole 34. In this way, the first snap portion 41 and the second snap portion 42 are both disposed inside the support unit, which can avoid affecting the overall appearance of the support unit because of exposed the first snap portion 41 and the second snap portion 42.

Furthermore, the first snap portion 41 comprises a first snap hook disposed in the first recessed hole 33, the second snap portion 42 comprises a second snap hook disposed in the second recessed hole 34, the cooperating insert-connection between the first insert-connecting portion 31 and the second insert-connecting portion 32 can guide the first snap hook and the second snap hook to be snap-fitted mutually. The snap fit between the first snap portion 41 and the second snap portion 42 can be achieved by mutual engaging between the first snap hook and the second snap hook, which can improve the stability of the snap fit between the first snap portion 41 and the second d snap portion 42.

Furthermore, the first snap hook is a projection disposed at the inner wall of the first recessed hole 33, the second snap hook is connected with the bottom face of the second recessed hole 34 through an elastic connecting frame 60, the cooperating insert-connection between the first inset-connecting portion 31 and the second insert-connecting portion 32 can guide the second snap hook to extend into the first recessed hole 33 and to engage with the first snap hook. The first recessed hole 33 and the projection can be created by only one processing step, which can simplify the processing technology and also reduce production cost.

Preferably, the end of the second snap hook is provided with an unlock buckle 50, the bottom face of the pedestal 10 is provided with an opening 11, the opening 11 opens to the first recessed hole 33, the cooperating insert-connection between the first insert-connecting portion 31 and the second insert-connecting portion 32 can guide the unlock buckle 50 to extend into the opening 11.

When the support unit provided by the embodiment of the present disclosure needs to be disassembled, the user can push the unlock buckle 50 forcibly through the opening 11 in the bottom face of the pedestal 10. When the unlock buckle 50 is forced to move, it can cause the second snap hook to disengage from the snap block, so that the first insert-connecting portion 31 and the second connecting portion 32 can be separated easily without screwing bolt or some other operations to complete the disassembly process of the support unit. In this way, the disassembly process of the support unit can be simplified, so that the disassembly and the repair of the support unit of the display device can be more convenient.

Preferably, the elastic connecting frame 60 can be removed from the bracket 20, in particular by bolt connection. When the second snap hook and the projection cannot be stably snap-fitted due to the damage of the second snap hook or the reduced elastic strength of the elastic connecting frame 60, the elastic connecting frame 60 can be removed and merely a second snap hook or an elastic connecting frame 60 can be replaced without integrally replacing the bracket 20 or the pedestal 10, so that the repair cost of the support unit can be reduced.

Figure 3:
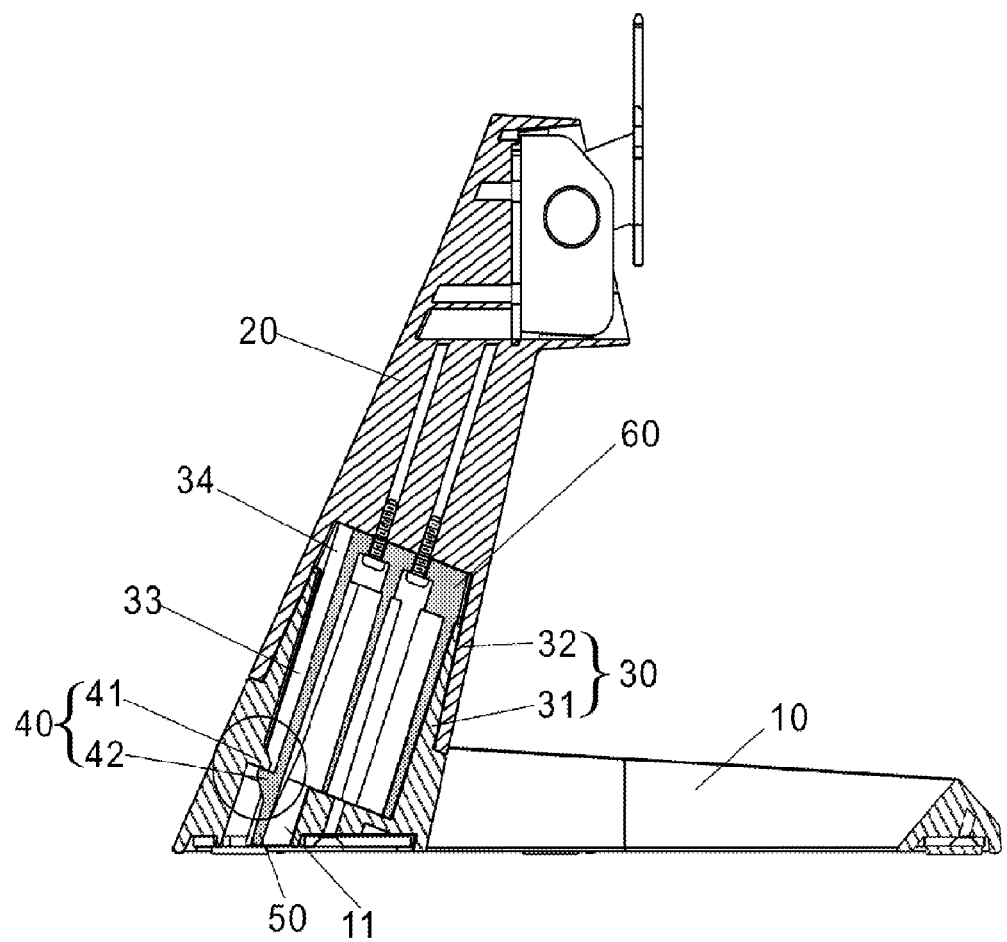
FIG. 3 is a schematic sectional view along direction A-A in FIG. 2.
Figure 4:
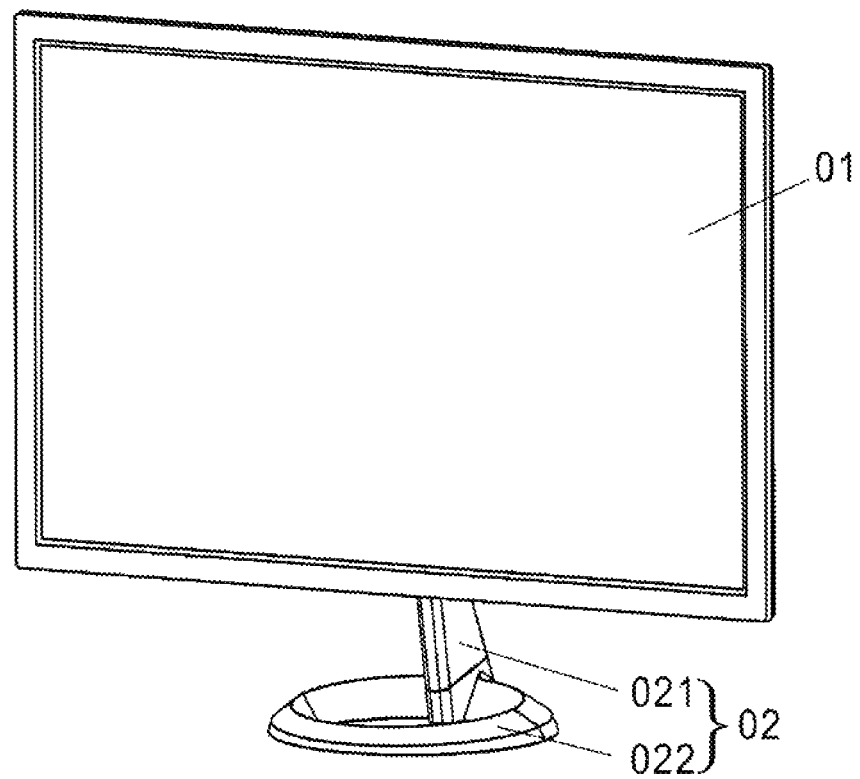
FIG. 4 is a schematic view showing the structure of a display device with a support unit in prior art.
Figure 5:
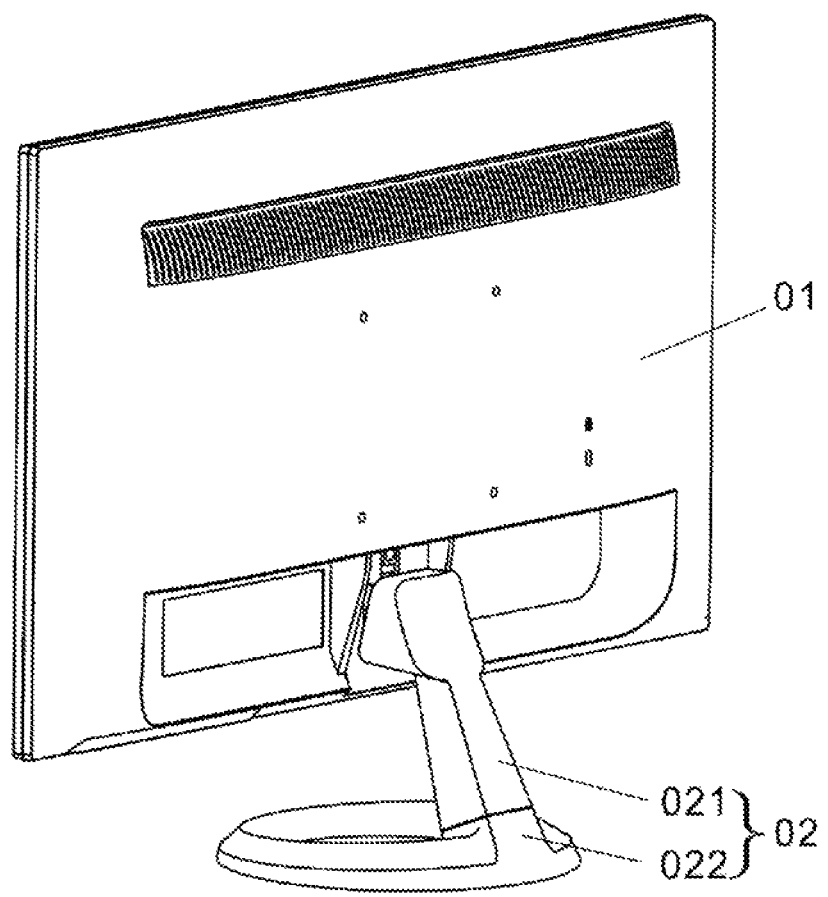
FIG. 5 is a schematic rear view of the display device with the support unit in prior art.

In above various embodiments, the first insert-connecting portion 31 can be an insert slot, the second insert-connecting portion 32 can be an insert block that can be inserted into the insert slot; or alternatively the second insert-connecting portion 31 is an insert slot; the first insert-connecting portion is 31 an insert block that can be inserted into the insert slot. It needs to be noted that in a preferred embodiment of the present disclosure, as shown in FIG. 3, the first insert-connecting portion 31 can be an insert slot; the second insert-connecting portion 32 can be an insert block that can be inserted into the insert slot.

Specifically, the insert block is in the shape of triangular prism, the shape of the insert slot is adapted to the shape of the insert block. The cross-section of the triangular prism is triangular. Triangular shape has good stability and can have stable support function. It is not easily deformed, so it can prevent the insert block or the insert slot to be deformed by force. Therefore, it is advantageous to improve the strength of the insert-connection between the insert slot and the insert block.

First Embodiment

Taking the embodiment wherein the first insert-connecting portion 31 at the pedestal 10 is an insert slot and the second insert-connecting portion 32 at the bracket 20 is an insert block as an example, the support unit of the display device according to an embodiment of the present disclosure will be described in more detail.

The present disclosure provides a support unit for the display device, comprising a pedestal 10 and a bracket 20, one end of the bracket 20 is connected to a display panel, the other end of the bracket 20 is insert-connected with the pedestal 10 through an insert-connecting structure 30 and is locked by a snap structure 40. The insert-connecting structure 30 comprises an insert slot disposed in the pedestal 10 and an insert block disposed in the bracket 20. The snap structure 40 comprises a first snap portion 41 disposed at the pedestal 10 and a second snap portion 42 disposed at the bracket 20. The cooperating insert-connection between the insert slot and the insert block can guide the mutual snap fit between the first snap portion 41 and the second snap portion 42, so that the disengaging of the pedestal 10 from the bracket 20 along the insert-connecting direction can be prevented.

Wherein, the insert block is in the shape of triangular prism, the shape of the insert slot is adapted to the shape of the insert block. The cross-section of the triangular prism is triangular. Triangular shape has good stability and can have stable support function. It is not easily deformed, so it can prevent the insert block or the insert slot to be deformed by force. Therefore, it is advantageous to improve the strength of the insert-connection between the insert slot and the insert block.

Specifically, a first recessed hole 33 is provided in the insert slot and the first snap portion 41 is disposed in the first recessed hole 33; a second recessed hole 34 is provided in the insert block and the second snap portion 42 is disposed in the second recessed hole 34, wherein the opening of the first recessed hole 33 is opposite to opening of the second recessed hole 34. In this way, the first snap portion 41 and the second snap portion 42 are both disposed inside the support unit, which can avoid affecting the overall appearance of the support unit because of exposed first snap portion 41 and second snap portion 42.

Furthermore, the first snap portion 41 comprises a first snap hook disposed in the first recessed hole 33, the second snap portion 42 comprises a second snap hook disposed in the second recessed hole, the cooperating insert-connection between the insert block and the insert slot can guide the first snap hook and the second snap hook to be snap-fitted mutually.

Furthermore, the first snap hook is a projection disposed at the inner wall of the first recessed hole 33, the second snap hook is connected with the bottom face of the second recessed hole 34 through an elastic connecting frame 60, the cooperating insert-connection between the insert slot and insert block can guide the second snap hook to extend into the first recessed hole 33 and to engage with the first snap hook.

Preferably, the end of the second snap hook is provided with an unlock buckle 50, the bottom face of the pedestal 10 is provided with an opening 11, the opening 11 opens to the first recessed hole 33, the cooperating insert-connection between the insert slot and the insert block can guide the unlock buckle 50 to extend into the opening 11.

When the support unit provided by the embodiment of the present disclosure needs to be disassembled, the user can push the unlock buckle 50 forcibly through the opening 11 in the bottom face of the pedestal 10. When the unlock buckle 50 is forced to move, it can cause the second snap hook to disengage from the snap block, so that the insert slot and the insert block can be separated easily without screwing bolt(s) or some other operations to complete the disassembly process of the support unit. In this way, the disassembly process of the support unit can be simplified, so that the disassembly and the repair of the support unit of the display device can be more convenient.

Optionally, the elastic connecting frame 60 can be removed from the bracket 20, in particular by bolt connection. When the second snap hook and the projection cannot be stably snap-fitted due to the damage of the snap hook or the reduced elastic strength of the elastic connecting frame 60, the elastic connecting frame 60 can be removed and a new snap hook or elastic connecting frame 60 can be replaced without replacing the bracket 20 or the pedestal 10, so that the repair cost of the support unit can be reduced.

In assembling the support unit provided by the embodiment of the present disclosure, after the insert-connecting operation of the insert slot and the insert block is completed, the snap fitting operation between the first snap portion 41 and the second snap portion 42 is also completed, so the disengaging of the pedestal 10 from the bracket 20 along the insert-connecting direction can be prevented. Therefore, when assembling the support unit provided by the embodiment of the present disclosure, the pedestal 10 and the bracket 20 can be stably connected together by only one step of insert-connecting operation, without screwing bolt(s) or other operations in the prior art. In this way, the assembling process of the support unit can be simplified and the disassembling and assembling of the support unit of the display device can be more convenient.

Second Embodiment

As shown in FIG. 3, taking the embodiment wherein the first insert-connecting portion 31 at the pedestal 10 is an insert block and the second insert-connecting portion 32 at the bracket 20 is an insert slot as an example, the support unit of the display device provided by an embodiment of the present disclosure will be described in detail.

The present disclosure provides a support unit for the display device, comprising a pedestal 10 and a bracket 20, one end of the bracket 20 is connected to a display panel, the other end of the bracket 20 is insert-connected with the pedestal 10 through an insert-connecting structure 30 and is locked by a snap structure 40. The insert-connecting structure 30 comprises an insert block disposed in the pedestal 10 and an insert slot disposed in the bracket 20. The snap structure 40 comprises a first snap portion 41 disposed at the pedestal 10 and a second snap portion 42 disposed at the bracket 20. The cooperating insert-connection between the insert block and the insert slot can guide the first snap portion 41 and the second snap portion 42 to be snap-fitted mutually, so that the disengaging of the pedestal 10 from the bracket 20 along the insert-connecting direction can be prevented.

Wherein, the insert block is in the shape of triangular prism, the shape of the insert slot is adapted to the shape of the insert block. The cross-section of the triangular prism is triangular. Triangular shape has good stability and can have stable support function. It is not easily deformed, so it can prevent the insert block or the insert slot to be deformed by force. Therefore, it is advantageous to improve the strength of the insert-connection between the insert slot and the insert block.

Specifically, a first recessed hole 33 is provided in the insert block and the first snap portion 41 is disposed in the first recessed hole 33; a second recessed hole 34 is provided in the insert slot and the second snap portion 42 is disposed in the second recessed hole 34, wherein the opening of the first recessed hole 33 is opposite to the opening of the second recessed hole 34. In this way, the first snap portion 41 and the second snap portion 42 are both disposed inside the support unit, which can avoid affecting the overall appearance of the support unit because of exposed first snap portion 41 and second snap portion 42.

Furthermore, the first snap portion 41 comprises a first snap hook disposed in the first recessed hole 33, the second snap portion 42 comprises a second snap hook disposed in the second recessed hole 34, the cooperating insert-connection between the first insert-connecting portion 31 and the second insert-connecting portion 32 can guide the first snap hook and the second snap hook to be snap-fitted mutually.

Furthermore, the first snap hook is a projection disposed at the inner wall of the first recessed hole 33, the second snap hook is connected with the bottom face of the second recessed hole 34 through an elastic connecting frame 60, the cooperating insert-connection between the first inset-connecting portion 31 and the second insert-connecting portion 32 guide the second snap hook to extend into the first recessed hole 33 and to engage with the first snap hook.

Optionally, the shape of the elastic connecting frame 60 is adapted to the shape of the first recessed hole 33; after the cooperating insert-connection between the insert slot and the insert block, the elastic connecting frame 60 is located in the first recessed hole 33 and the outer wall of the elastic connecting frame 60 and the inner wall of the first recessed hole 33 are snugly fitted. In this way, after the insert slot is insert-connected with the insert block, the outer wall of the insert block is abutted against the inner wall of the insert slot, and the inner wall of the first recessed hole 33 in the insert block is snugly fit with the outer wall of the elastic connecting frame 60, which is advantageous to improve the strength of the insert-connection between the insert block and the insert slot.

Preferably, the end of the second snap hook is provided with an unlock buckle 50, the bottom face of the pedestal 10 is provided with an opening 11, the opening 11 opens to the first recessed hole 33, the cooperating insert-connection between the first insert-connecting portion 31 and the second insert-connecting portion 32 can guide the unlock buckle 50 to extend into the opening 11.

When the support unit provided by the embodiment of the present disclosure needs to be disassembled, the user can push the unlock buckle 50 forcibly through the opening 11 in the bottom face of the pedestal 10. When the unlock buckle 50 is forced to move, it can cause the second snap hook to disengage from the snap block, so that the first insert-connecting portion 31 and the second connecting portion 32 can be separated easily without screwing bolt(s) or some other operations to complete the disassembly process of the support unit. In this way, the disassembly process of the support unit can be simplified, so that the disassembly and the repair of the support of the display device can be more convenient.

Optionally, the elastic connecting frame 60 can be removed from the bracket 20, in particular by bolt connection. When the second snap hook and the projection cannot be stably snap-fitted due to the damage of the snap hook or the reduced elastic strength of the elastic connecting frame 60, the elastic connecting frame 60 can be removed and a new snap hook or elastic connecting frame 60 can be replaced without replacing the bracket 20 or the pedestal 10, so that the repair cost of the support unit can be reduced.

In addition, an embodiment of the present disclosure also provides a display device comprising a display panel, and the support unit for the display device provided by any one of the above mentioned technical solutions, wherein the display and the bracket of the support unit can be removably connected. The display device herein can be liquid crystal display or TV, electronic paper display or TV, OLED (Organic Light Emitting Diode) display or TV or any other products or components with display function.

Based on the advantages of the support unit provided by the above technical solutions, in the display device with the above mentioned support unit provided by the embodiment, the assembling process of the support unit is relatively simple thereby the disassembly of the display device can be more convenient.

In the description of the present specification, specific features, structures, materials or characteristics can be combined in suitable ways in any one or more embodiments.

The above description is only some specific embodiments of the present disclosure. However, the protection scope of the present disclosure is not limited by this. Any variations and modifications occurred to those ordinary skilled in the art based on the technical scope of the present disclosure are embraced within the protection scope of the present disclo-

The invention claimed is:

1. A support unit for a display device comprising:
a pedestal and a bracket;
wherein one end of the bracket is connected to a display panel, the other end of the bracket is insert-connected with the pedestal through an insert-connecting structure and is locked by a snap structure;
wherein the insert-connecting structure comprises a first insert-connecting portion disposed at the pedestal and a second insert-connecting portion disposed at the bracket;
wherein the snap structure comprises a first snap portion disposed at the pedestal and a second snap portion disposed at the bracket; and
wherein the first insert-connecting portion and the second insert-connecting portion mutually connect to guide the first snap portion and the second snap portion to be snap-fitted mutually, so that disengagement of the pedestal from the bracket along an insert-connecting direction is prevented.

2. The support unit for the display device according to claim 1,
wherein a first recessed hole is provided in the first insert-connecting portion and the first snap portion is disposed in the first recessed hole; a second recessed hole is provided in the second insert-connecting portion and the second snap portion is disposed in the second recessed hole; and
wherein an opening of the first recessed hole is opposite to an opening of the second recessed hole.

3. The support unit for the display device according to claim 2, wherein the first snap portion comprises a first snap hook disposed in the first recessed hole, the second snap portion comprises a second snap hook disposed in the second recessed hole, the first insert-connecting portion and the second insert-connecting portion mutually connect to guide the second snap hook and the first snap hook to be snap-fitted mutually.

4. The support unit for the display device according to claim 3, wherein the first snap hook is a projection disposed at an inner wall of the first recessed hole; the second snap hook is connected with a bottom face of the second recessed hole through an elastic connecting frame; and the first inset-connecting portion and the second insert-connecting portion mutually connect to guide the second snap hook to extend into the first recessed hole and to engage with the first snap hook.

5. The support unit for the display device according to claim 4, wherein an end of the second snap hook is provided with an unlock buckle; a bottom face of the pedestal is provided with an opening, the opening opens to the first recessed hole; and the first insert-connecting portion and the second insert-connecting portion mutually connect to guide the unlock buckle to extend into the opening.

6. The support unit for the display device according to claim 4,
wherein a shape of the elastic connecting frame is adapted to a shape of the first recessed hole; and
wherein after the first insert-connecting portion and the second insert-connecting portion mutually connect, the elastic connecting frame is located in the first recessed hole and an outer wall of the elastic connecting frame and an inner wall of the first recessed hole are snugly fitted.

7. The support unit for the display device according to claim 4, wherein the elastic connecting frame is removable from the bracket.

8. The support unit for the display device according to claim 1, wherein the first insert-connecting portion is an insert slot, the second insert-connecting portion is an insert block that can be inserted into the insert slot.

9. The support unit for the display device according to claim 8, wherein the insert block is in a shape of a triangular prism, a shape of the insert slot is adapted to a shape of the insert block.

10. A display device comprising:
a display panel and a support unit;
wherein the support unit comprises a pedestal and a bracket;
wherein one end of the bracket is connected to the display panel, the other end of the bracket is insert-connected with the pedestal through an insert-connecting structure and is locked by a snap structure;
wherein the insert-connecting structure comprises a first insert-connecting portion disposed at the pedestal and a second insert-connecting portion disposed at the bracket;
wherein the snap structure comprises a first snap portion disposed at the pedestal and a second snap portion disposed at the bracket; and
wherein the first insert-connecting portion and the second insert-connecting portion mutually connect to guide the first snap portion and the second snap portion to be snap-fitted mutually, so that disengagement of the pedestal from the bracket along an insert-connecting direction is prevented, and the display panel is removably connected to the bracket.

11. The display device according to claim 10,
wherein a first recessed hole is provided in the first insert-connecting portion and the first snap portion is disposed in the first recessed hole; a second recessed hole is provided in the second insert-connecting portion and the second snap portion is disposed in the second recessed hole; and
wherein the opening of the first recessed hole is opposite to the opening of the second recessed hole.

12. The display device according to claim 11, wherein the first snap portion comprises a first snap hook disposed in the first recessed hole, the second snap portion comprises a second snap hook disposed in the second recessed hole, and the first insert-connecting portion and the second insert-connecting portion mutually connect to guide the second snap hook and the first snap hook to be snap-fitted mutually.

13. The display device according to claim 12, wherein the first snap hook is a projection disposed at an inner wall of the first recessed hole, the second snap hook is connected with a bottom face of the second recessed hole through an elastic connecting frame, and the first inset-connecting portion and the second insert-connecting portion mutually connect to guide the second snap hook to extend into the first recessed hole and to engage with the first snap hook.

14. The display device according to claim 13, wherein an end of the second snap hook is provided with an unlock buckle, a bottom face of the pedestal is provided with an opening, the opening opens to the first recessed hole, the first insert-connecting portion and the second insert-connecting portion mutually connect to guide the unlock buckle to extend into the opening.

15. The display device according to claim 13, wherein a shape of the elastic connecting frame is adapted to a shape of the first recessed hole; after the mutual insert-connection between the first insert-connecting portion and the second insert-connecting portion, the elastic connecting frame is located in the first recessed hole and an outer wall of the elastic connecting frame and an inner wall of the first recessed hole are snugly fitted.

16. The display device according to claim 13, wherein the elastic connecting frame is removable from the bracket.

17. The display device according to claim 10, wherein the first insert-connecting portion is an insert slot, the second insert-connecting portion is an insert block that can be inserted into an insert slot.

18. The display device according to claim 17, wherein the insert block is in a shape of a triangular prism, a shape of the insert slot is adapted to a shape of the insert block.

19. The display device according to claim 10, wherein the second insert-connecting portion is an insert slot and the first insert-connecting portion is an insert block that can be inserted into the insert slot.

20. The support unit for the display device according to claim 1, wherein the second insert-connecting portion is an insert slot and the first insert-connecting portion is an insert block that can be inserted into the insert slot.

* * * * *